United States Patent
Schmutz et al.

(10) Patent No.: US 6,370,185 B1
(45) Date of Patent: Apr. 9, 2002

(54) TRANSLATING REPEATER SYSTEM WITH IMPROVED BACKHAUL EFFICIENCY

(75) Inventors: Thomas R. Schmutz; Michael A. Komara, both of Indialantic; John R. Noll, Palm Bay, all of FL (US)

(73) Assignee: Airnet Communications Corporation, Melbourne, FL (US)

( * ) Notice: Subject to any disclaimer, the term of this patent is extended or adjusted under 35 U.S.C. 154(b) by 0 days.

(21) Appl. No.: 09/636,344

(22) Filed: Aug. 10, 2000

Related U.S. Application Data

(60) Provisional application No. 60/147,988, filed on Aug. 10, 1999.

(51) Int. Cl.[7] .............................................. H04L 25/60
(52) U.S. Cl. ........................................ 375/214; 455/17
(58) Field of Search ................. 375/211, 214; 455/16, 17, 20, 21, 22, 23

(56) References Cited

U.S. PATENT DOCUMENTS

| 5,890,055 A | * 3/1999 | Chu et al. ..................... 455/16 |
| 5,970,410 A | 10/1999 | Carney et al. |
| 5,978,650 A | * 11/1999 | Fischer et al. ................ 455/3.1 |

* cited by examiner

Primary Examiner—Don N. Vo
(74) Attorney, Agent, or Firm—Akerman Senterfitt

(57) ABSTRACT

The invention discloses a method and apparatus for supporting increased capacity on a backhaul communications link carrier frequency of a wireless communication system the uses a repeater station. Uplink RF carrier signals from a plurality of mobile units each having a first modulation scheme, are received at a serving repeater station. These uplink signals containing traffic and control information are demodulated and then re-modulated by a second modulation scheme having a higher-order modulation than the first modulation scheme. The re-modulated signal containing a plurality of uplink carrier signals within a single RF carrier signal is then transmitted over an uplink channel of a backhaul communication link.

Additionally, the invention discloses a method for aggregating data on the uplink channel of a backhaul communications link. A plurality of uplink RF carrier signals from a plurality of mobile units are each received at a repeater station. Each of the uplink carrier signals containing traffic and control information are then compressed into a single RF carrier signal which is transmitted over an uplink channel of a backhaul communication link.

22 Claims, 7 Drawing Sheets

TRANSLATING REPEATER SYSTEM WITH IMPROVED BACKHAUL EFFICIENCY

CROSS REFERENCE TO RELATED APPLICATIONS

This application claims the benefit of provisional patent of application serial No. 60/147,988 filed Aug. 10, 1999.

STATEMENT REGARDING FEDERALLY SPONSORED RESEARCH OR DEVELOPMENT (Not Applicable)

BACKGROUND OF THE INVENTION

1. Technical Field

This invention concerns cellular communications, and more particularly RF repeater systems.

2. Description of the Related Art

Conventional wireless cellular communications systems have a common architecture in which one or more defined cell sites are formed by the placement of one or more base transceiver stations within a geographic area. A cell site is typically depicted as a hexagonal area in which a transceiver is located such that a radio communication link can be established between the cellular system and a plurality of mobile stations within the defined geographic area for the cell.

In order to extend the coverage of conventional base transceiver station (BTS) systems over a larger geographical area, cell service providers have found it useful to employ translating repeaters. In the uplink direction, signals transmitted by a mobile station (mobile transceiver unit) located in a remote cell are received at the repeater, translated to a different carrier frequency, and then transmitted to the host BTS. Likewise, in the downlink direction, signals transmitted by the host BTS are received by the repeater, translated to a different carrier frequency, and then transmitted to mobile stations. The RF carrier link between the repeater and the BTS is known as the "backhaul channel," hereinafter, backhaul channel, and the carrier frequency on which the backhaul channel is operated is called the "backhaul frequency."

Some translating repeaters, such as the AirSite® repeater system offered by AirNet Communications Corporation of Melbourne, Fla. advantageously make use of existing in-band RF carrier frequencies to backhaul cellular communications traffic. As used herein, the term "in-band" refers to carrier frequencies that are within the frequency spectrum allocation assigned to the service provider for providing cellular communications services to mobile subscribers. Use of in-band radio frequency channels to backhaul cellular communications traffic from remote repeater sites is highly advantageous as it eliminates costly wireline T1 or microwave connections.

While use of in-band radio frequency channels to backhaul cellular communications traffic has distinct advantages, it also has some drawbacks. For example, in conventional wireless translating repeaters, a full duplex backhaul channel requires a pair of corresponding uplink and downlink backhaul RF carrier frequencies. Use of such in-band channels for providing a backhaul link necessarily reduces the number of channels available to a service provider on which to communicate with mobile subscribers. As mobile subscriber traffic increases, additional RF carrier channels must be allocated for the backhaul function. In sectorized systems, a corresponding backhaul transceiver must be provided for each sector transceiver operating for a given site.

In conventional translating repeaters, the digitally coded voice data as received from the mobile units is automatically re-transmitted to the base station without modification of the encoded data. In systems conforming to the GSM standard/specification, voice data is always transmitted using Gaussian Minimum Shift Keying (GMSK) modulation scheme along with both frequency division multiple access (FDMA) and time division multiple access (TDMA) schemes. In accordance with the GSM standard/specification, information is carried in frames in each uplink and downlink carrier frequency channel. Each GSM frame is divided into time slices called timeslots, with each frame having 8 timeslots.

While the foregoing GSM system ensures that at least eight mobile units can be assigned to a single carrier frequency, it still requires a dedicated pair of uplink and downlink carrier frequencies for each backhaul channel. This creates a problem since the number of carrier frequencies or channels assigned to each service provider is limited. This is particularly true when there are a number of translator base stations, with each requiring its own assigned set of backhaul carrier frequencies.

Another problem with conventional translating repeaters is that they do not perform complete radio frequency RF demodulation and modulation functions. Instead, they downconvert the RF signal to an intermediate frequency (IF) and then up-convert the signal to the translated RF carrier frequency. Consequently, bit error rate (BER) performance is not improved, and can actually be made worse. A further problem is that, in a conventional repeater, the GSM slot/frame timing information for the uplink signal is derived as an offset to the uplink signal.

Another disadvantage of conventional repeaters is that power level control of the downlink and uplink signals is performed using RF envelope detection, signal delays, microcontroller look-up tables, and digitally-controlled RF step attenuators. This analog circuitry used to accomplish these functions is susceptible to variations in temperature since the equipment housing the repeater stations are remotely located in small outdoor huts. The equipment must therefore be designed to make the necessary compensation and adjustments to ensure proper functionality.

Yet another disadvantage of conventional repeaters is that diversity switching of multiple uplink signals is performed using RF envelope detection, analog signal delay, microcontroller processing, and a digitally controlled RF switch. This circuitry is also susceptible to variations in temperature and requires careful compensation and adjustment for proper functionality. Similarly, with conventional wireless repeater systems, in-band control of the repeater and repeater alarm notification is difficult to perform since control bits must be demodulated from the downlink path and alarm/status bits must be modulated onto the uplink path.

SUMMARY OF THE INVENTION

The instant invention discloses a method for supporting increased capacity on a backhaul communication link carrier frequency in a wireless communication system having a base station located within a home cell, and a plurality of substantially adjacent cells each having a repeater station located therein. The method comprises receiving at one of the repeater stations, a first RF signal having a first modulation scheme from a mobile transceiver unit on an uplink channel. The first RF signal from the mobile transceiver unit is demodulated at the repeater station to obtain a digital data stream. The resulting digital data stream is then re-modulated onto a second RF signal at the repeater station.

The re-modulation uses a second modulation scheme having a higher-order modulation as compared to the first modulation scheme. Following re-modulation the second RF signal having the higher-order modulation scheme is then transmitted from the repeater station over the backhaul communication link to the base station.

In accordance with the invention, each of the first and the second RF signal is comprised of a plurality of TDM channels and each mobile unit is assigned one of the TDM channels of the first RF signal. Furthermore, a plurality of the TDM channels of the first RF signal are compressed into a single TDM channel on the second RF signal. Additionally, the first modulation scheme has a first associated data rate and the second modulation scheme has a second associated data rate, the second data rate being at least equal to the first data rate. Moreover, the second data rate is at least equal to the combined data rate of the TDM channels comprising the first RF signal.

In another aspect of the invention, the first modulation scheme is Gaussian Minimum Shift Keying (GMSK). In another aspect of the invention, the second modulation scheme is a Phase Shift Keying (PSK) scheme having at least 8 states. It should readily be understood by one skilled in the art that any other high order modulation scheme can be utilized without departing from the spirit of the invention. For example, a Quadrature Amplitude Modulation (QAM) scheme having at least 16 states (16-QAM) could be used.

In yet a further embodiment of the invention, a method is provided for aggregating data on a backhaul communication link in a wireless communication system having a base station located within a home cell, and a plurality of substantially adjacent cells each having a repeater station located therein. The method comprises, receiving at a repeater station, uplink RF carrier signals from each of a plurality of mobile units at a repeater station. Each of the received uplink RF carrier signals from the plurality of mobile units are then compressed at the repeater station into a single RF carrier signal. The single RF carrier signal containing the compressed uplink RF carrier signals is then transmitted from the repeater station on an uplink channel of a backhaul communication link to a serving base station within a home cell.

In yet another embodiment of the instant invention, a system for supporting increased capacity on a backhaul communication link carrier frequency in a wireless communication system having a base station located within a home cell, and a plurality of substantially adjacent cells each having a repeater station located therein, is disclosed. The system is comprised of a receiver for receiving at one of the repeater stations, a first RF signal having a first modulation scheme from a mobile transceiver unit on an uplink channel. A demodulator is provided within the receiver for demodulating at the repeater station, the first RF signal from the mobile transceiver unit to obtain a digital data stream. A digital communication link communicates the digital data stream from the demodulator to a modulator. The modulator modulates the digital data stream onto a second RF signal at the repeater station using a second modulation scheme having a higher-order modulation as compared to the first modulation scheme. A transmitter coupled to the modulator transmits from the repeater station, the second RF signal having a higher-order modulation over the backhaul communication link to the base station.

In accordance with the invention, each of the first and the second RF signal is comprised of a plurality of TDM channels and each mobile unit is assigned one of the TDM channels of the first RF signal. Furthermore, a plurality of the TDM channels of the first RF signal are compressed within a single TDM channel on the second RF signal.

Furthermore, the first modulation scheme has a first associated data rate and the second modulation scheme has a second associated data rate. Additionally, the second data rate is at least equal to the combined data rate of the TDM channels comprising the first RF signal.

In one aspect of the invention, the first modulation scheme is Gaussian Minimum Shift Keying (GMSK). In another aspect of the invention, the second modulation scheme is a Phase Shift Keying (PSK) scheme having at least 8 states (8-PSK). It should be readily understood by one skilled in the art that any higher-order modulation scheme can be used without departing from the spirit of the invention. For example, a Quadrature Amplitude Modulation (QAM) scheme having at least 16 states (16-QAM) can be used.

In still a further embodiment of the instant invention, a system for aggregating data on a backhaul communication link in a wireless communication system having a base station located within a home cell, and a plurality of substantially adjacent cells each having a repeater station located therein, is disclosed. The system comprises a receiver for receiving uplink RF carrier signals from each of a plurality of mobile units at a repeater station. A signal processor coupled to the receiver is used for compressing at the repeater station, each of the received uplink RF carrier signals from the plurality of mobile units into a single RF carrier signal. A transmitter coupled to the signal processor is used for transmitting the single RF carrier signal containing the compressed uplink RF carrier signals from the repeater station, on an uplink channel backhaul communication link, to the serving base station within the home cell.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
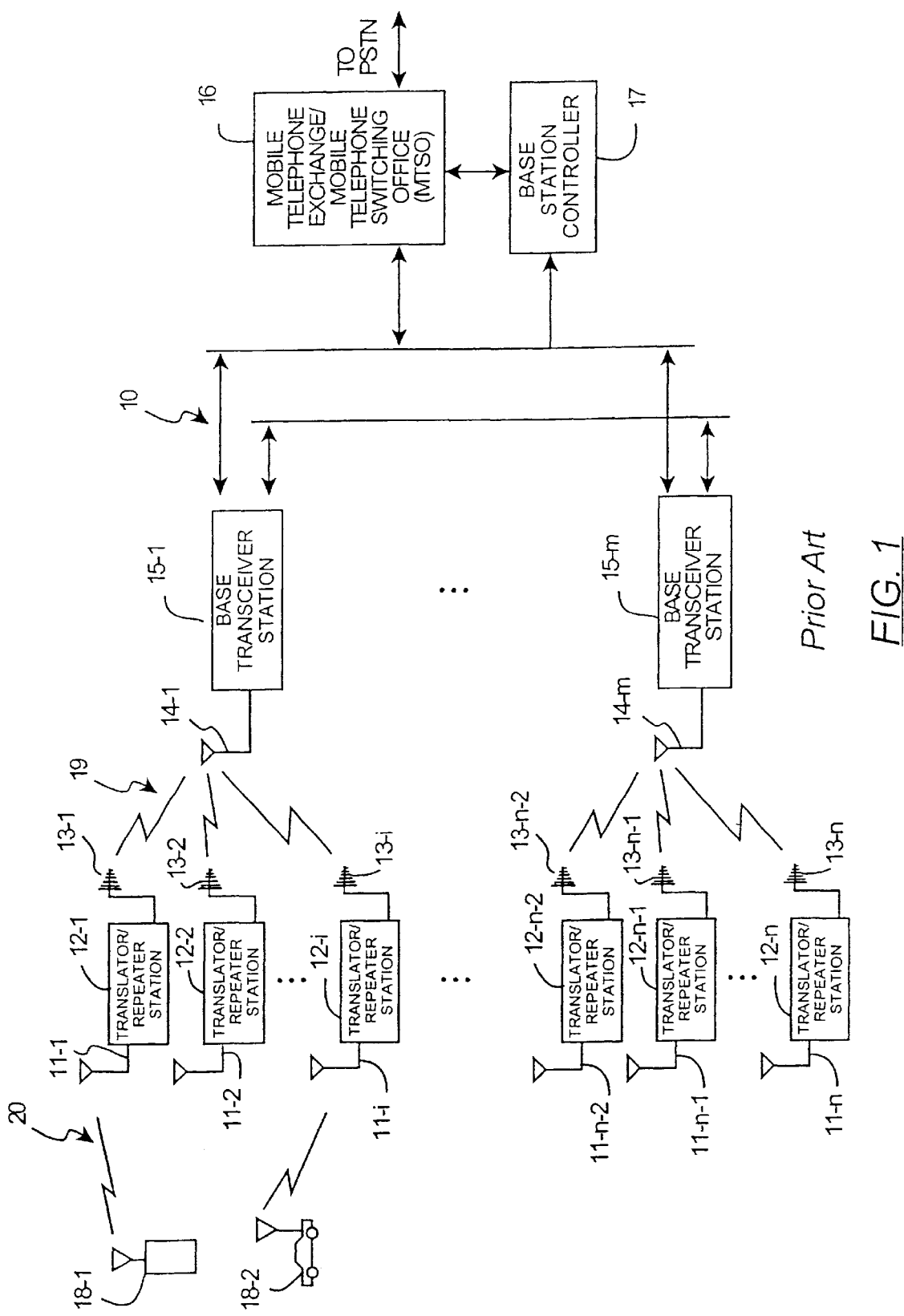
FIG. 1 is a block diagram of a wireless communications system employing wireless translator base stations.

FIG. 1 is a block diagram of a conventional wireless communications system such as a Personal Communication System ("PCS") or other similar system. In this system, single-omni type wireless translators are deployed in peripheral cells of a cell cluster to concentrate radio signal traffic to and from a broadband base transceiver station ("BTS"). Those skilled in the art will readily appreciate that sectorized wireless translators can also be used for this purpose. However, for convenience, the system will first be described relative to the single-omni type translator system.

The system 10 can include translator omni-directional antennas 11-1, 11-2, . . . 11-i, . . . 11-n-2, 11-n-1 and 11-n (collectively omni-directional antennas 11), translator stations 12-1, 12-2, . . . 12-i, . . . 12-n-2, 12-n-1 and 12-n (collectively translators 12), translator directional antennas 13-1, 13-2, . . . . 13-i, . . . 13-n-2, 13-n-1 and 13-n (collectively translator directional antennas 13), BTS omni-directional antennas 14-1, . . . 14-m (collectively BTS antennas 14), and broadband base transceiver stations 15-1, . . . 15-m (collectively BTS's 15). System 10 can further include mobile telephone exchange 16, one or more base station controllers 17 and a plurality of mobile subscriber units 18-1 and 18-2 (collectively mobile units 18).

Translators 12 conventionally receive radio signals from mobile units 18 through omni-directional antennas 11 and forward them to BTS's 15 through translator directional antennas 13. Likewise, radio signals transmitted from BTS's 15 through BTS antennas 14 are forwarded by translators 12 to mobile units 18. BTS's 15 are responsible for demodulating signals received from translators 12 through BTS antennas 14 and connecting these signals to the Public Switched Telephone Network ("PSTN") through mobile telephone exchange 16. In addition, BTS's 15 modulate signals received from the PSTN through mobile switching center 16 to format them for transmission through BTS antennas 14 to translators 12.

Figure 1A:
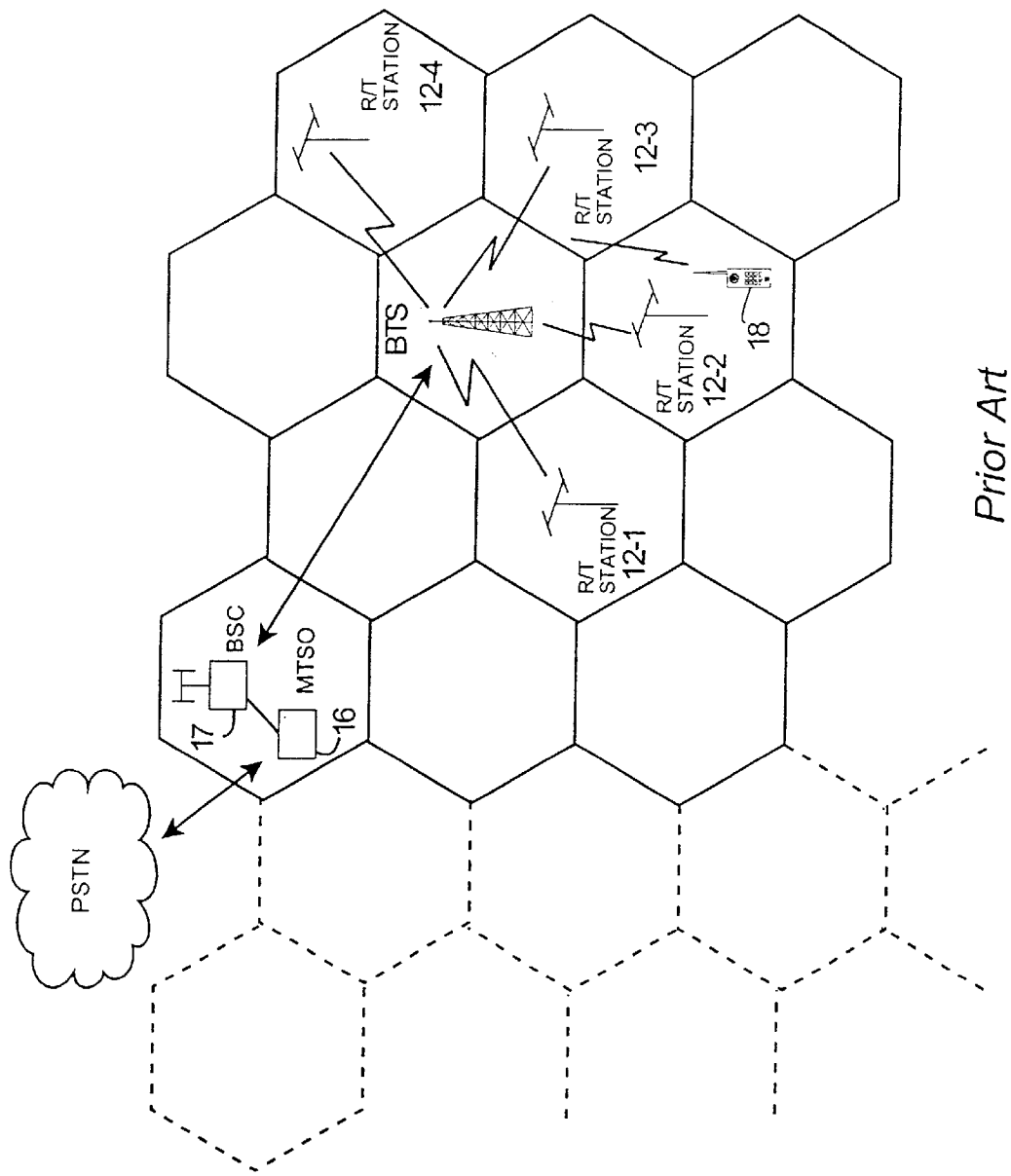
FIG. 1A. is a block diagram of a wireless communications system as in FIG. 1, illustrating the cell structure and possible proximity of the various entities.

FIG. 1A. shows the wireless communications system as in FIG. 1, illustrating the cell structure and possible proximity of the various entities. It should be readily understood that FIG. 1A is exemplary and as such, many other configurations with the various entities co-located in one or a plurality of cells are possible.

Figure 2:
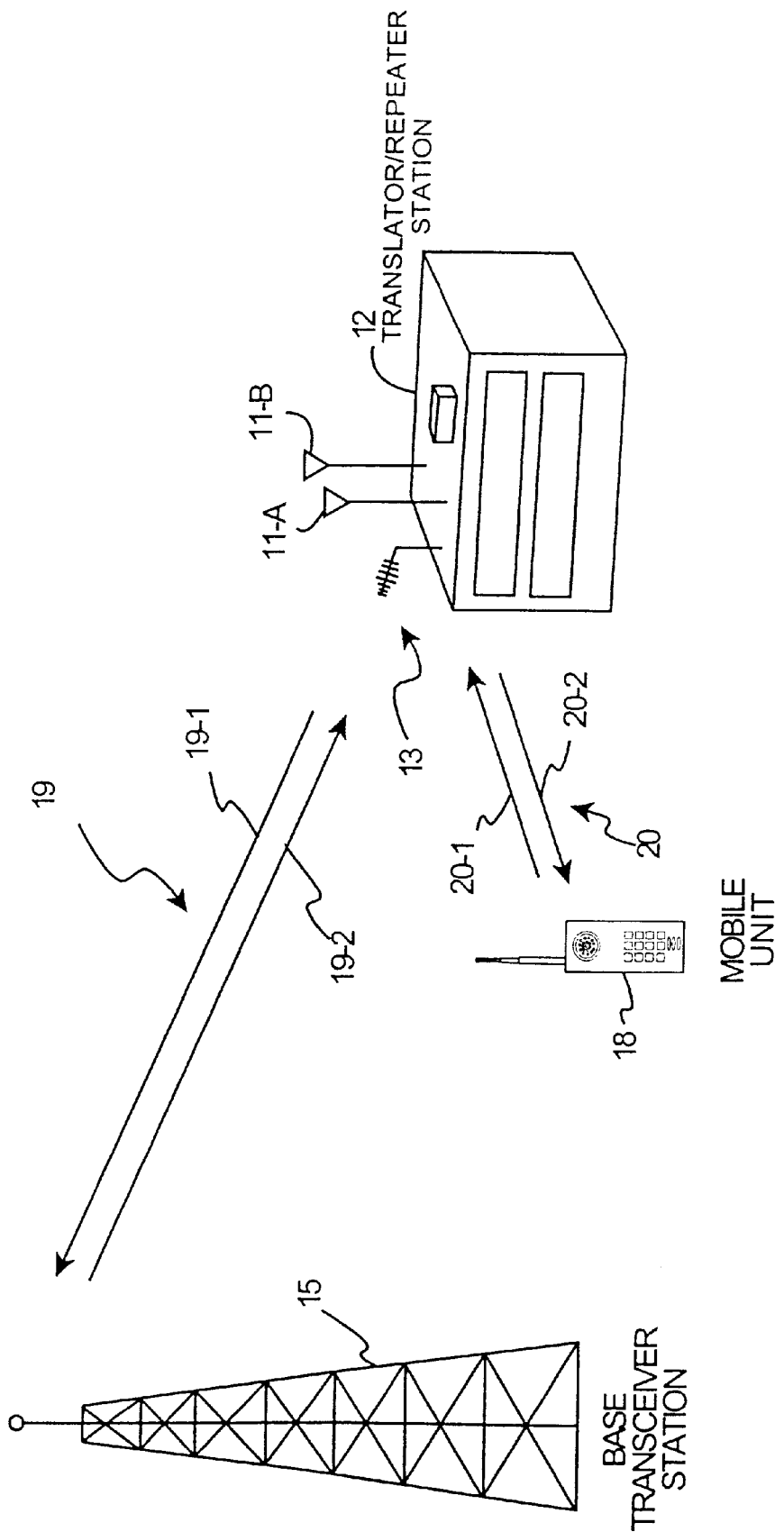
FIG. 2 is an exemplary arrangement of the wireless communications system of FIG. 1 showing how wireless links are deployed through the wireless translator.

FIG. 2 illustrates the basic operation of a translator/repeater station 12. In particular, translator 12 transmits signals to and receives signals from BTS 15 through backhaul channel 19. Similarly, translator 12 transmits signals to and receives signals from mobile unit 18 through ground link channel 20. Each of the ground link channel 20 and the backhaul channel 19 is defined by an uplink carrier frequency and a downlink carrier frequency. Because BTS 15 is stationary, translator 12 preferably employs directional antenna 13 to transmit and receive signals over backhaul channel 19. In contrast, because mobile units 18 are not stationary and the translator is not sectorized, translator 12 preferably employs one or more omni-directional antennas 11A and 11B respectively to transmit and receive signals over ground link channel 20-2.

Figure 3A:
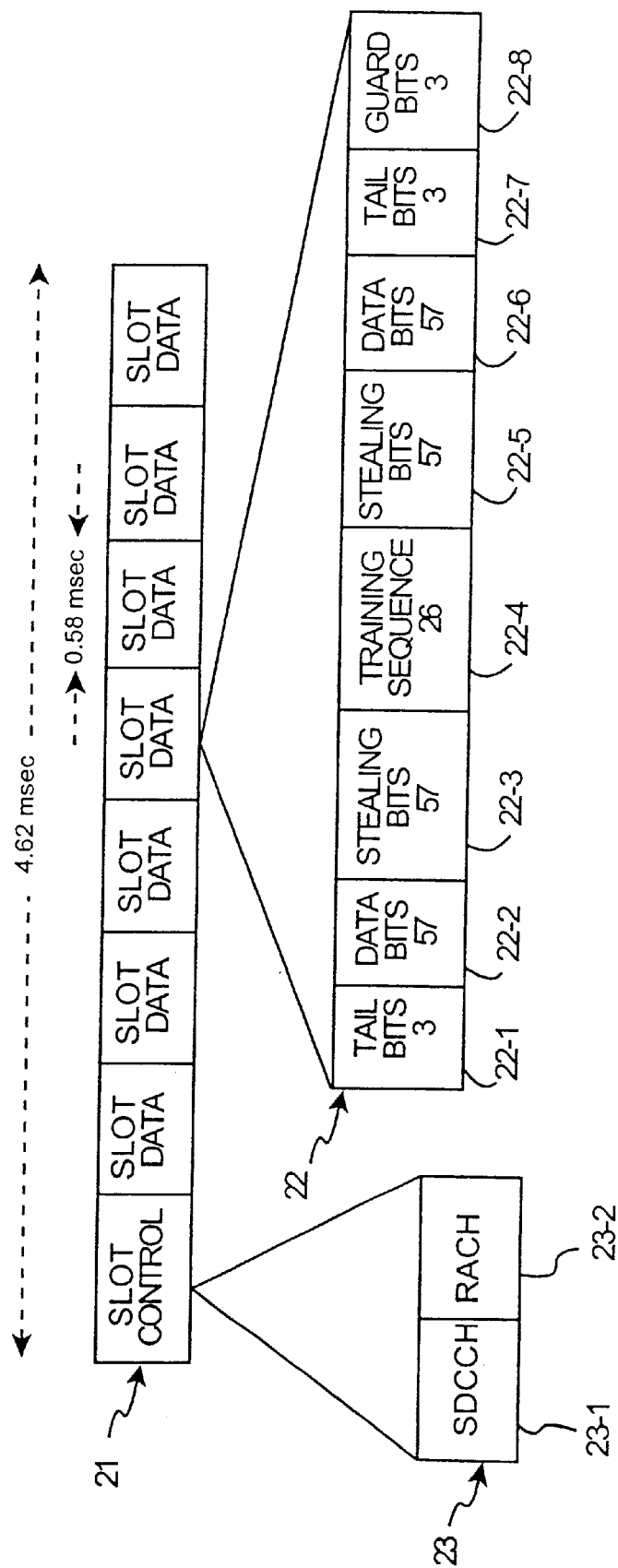
FIG. 3a illustrates an uplink GSM-type TDM time frame.

Communications between mobile units, repeaters, and the base station can be performed using a variety of multiplexing schemes that are well known in the art. For example, a time division multiplex (TDM) scheme may be used for this purpose. FIG. 3a shows a typical uplink GSM TDM frame 21 comprising eight time slots, used for transmission from a mobile user to a base station. The depicted GSM TDM frame has a duration of 4.62 milliseconds, including eight time slots of 0.58 milliseconds each. A sequence of digital bits makes up each time slot. Portions of a time slot, or sub-time slots, are generally assigned specific functions and are referred to herein as sub-channels. Time slots can be configured to support user traffic or can be used for system control information. Generally, for GSM-type TDM implementations using a single RF carrier, one time slot is dedicated to transmitting control information, while the remaining slots are available to transmit traffic information. Traffic channels can carry conversations or data, as well as information about the time slot itself.

In frame 21 of FIG. 3a, slot 0 contains control information and slots 1–7 contain traffic data. Typical formats for the control and traffic sub-channels are shown in time slot details 22, 23. Detail 22 of time slot 4 shows typical GSM format traffic sub-channels including tail bits 22-1, 22-7 used to indicate the beginning and end of a time slot, data bits 22-2, 22-6 which contain the digitized call information, and training sequence bits 22-4 used for equalization of multi-path signals. Stealing bits 22-3, 22-5 are provided to indicate if suppression of time slot data and replacement with priority data is requested. Finally, guard bits 22-8 are provided to keep the time frames separate. The number of bits contained in a typical traffic sub-channel is shown below the sub-channel designation in detail 22.

As noted earlier, in single TDMA RF carrier implementations, one slot will generally be a dedicated digital control channel. As shown in detail 23 of time slot 0, sub-channels in the uplink control time slot generally include a stand-alone dedicated control sub-channel (SDCCH) 23-1 and a random access sub-channel (RACH) 23-2. The SDCCH sub-channel 23-1 is used to transport information between the base station and a specific mobile unit to complete call set up or for transmission of messages for a mobile unit in idle mode. The RACH sub-channel 23-2 is used by the mobile unit to request access to the network during initial call set up.

Figure 3B:
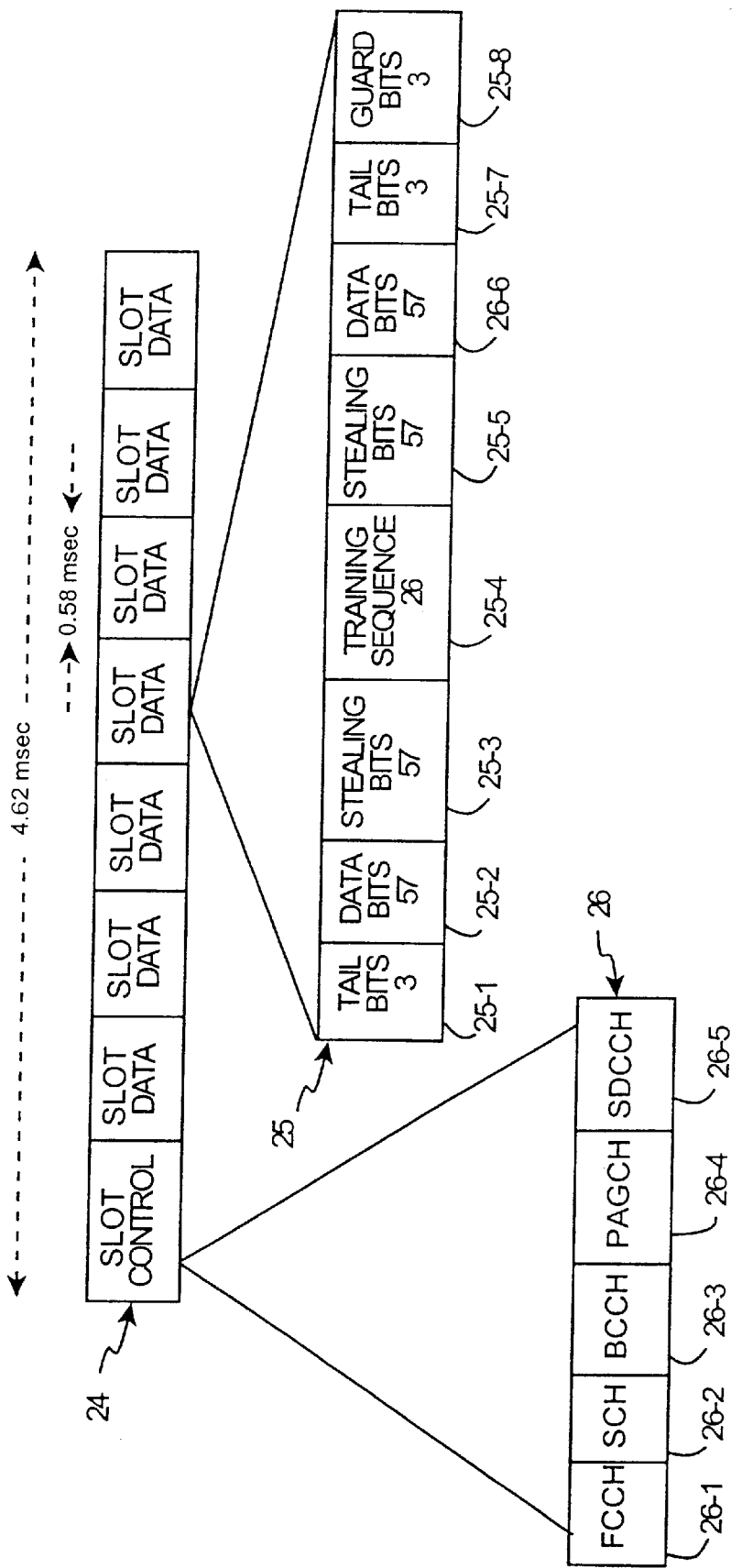
FIG. 3b illustrates a downlink GSM-type TDM time frame.

FIG. 3b shows a typical GSM-type eight slot TDM frame 24 used in downlink, base-to-mobile communications. Generally, the information format in the traffic time slots 1–7 remains the same, but more sub-channel data is included in the control time slot 0 as shown in detail 26. Specifically, a frequency correction sub-channel (FCCH) 26-1, synchronization sub-channel (SCH) 26-2, broadcast control sub-channel (BCCH) 26-3, paging and access grant sub-channel (PAGCH) 26-4, are added to the SDCCH sub-channel 26-5 in the downlink control time slot. However, the RACH sub-channel 23-2 is not included in the downlink signal. The FCCH sub-channel 26-1 transmits frequency correction information for a mobile unit to correct its time base, while the SCH 26-2 sub-channel transmits synchronization information for the mobile to synchronize to the framing structure of the network. The BCCH 26-3 sub-channel transmits information to idle mobile units such as local area identification and neighbor cell information. Finally, the PAGCH 26-4 sub-channel is used to page a mobile and grant access to a mobile unit during call set up.

Figure 4:
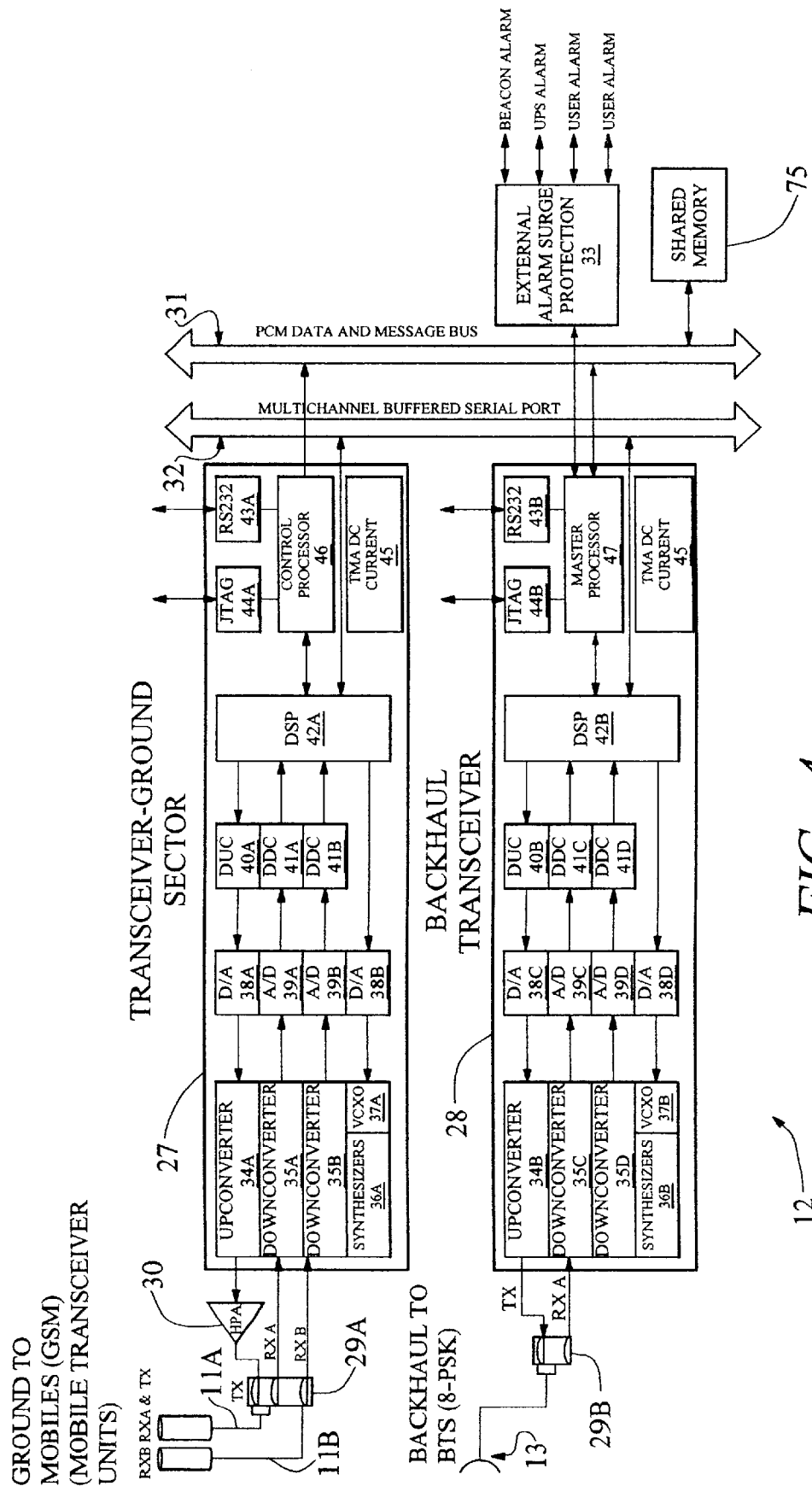
FIG. 4 is a block diagram of an exemplary single-omni type translating repeater station of the type shown in the wireless communication system of FIG. 1.

FIG. 4 is a detailed block diagram block of a translator/repeater station 12 that can be used in connection with the present invention. The translator station can comprise a ground sector transceiver 27 and backhaul transceiver 28. It will readily be appreciated by those skilled in the art that the particular transceiver architecture shown is not critical to the invention and the invention as described herein is not intended to be so limited.

In a preferred embodiment, transceivers 27 and 28 are each capable of transmitting and receiving over a broad range of carrier frequencies allocated to a service provider for multi-carrier operation. However, the invention is not limited in this regard and more narrowbanded transceivers can also be used for the purposes of the present invention. Each transceiver 27, 28 is preferably configured so that its operation can be controlled by microprocessors 46 and 47, respectively.

FIG. 4 shows a single sector omni-type wireless translator/repeater system, it being understood that the invention is not so limited. In fact, a variety of sectorized translators/repeaters can also be used for this purpose. Signals from a mobile unit 18 are received at omni-directional antennas 11A and/or 11B attached to ground sector transceiver 27. These signals are encoded and transmitted by mobile unit 18 using a standard wireless telephony format such as GSM and typically range in power from between about −111 to −25 dBm. The signal passes through cavity filter 29A on to downconverter 35A or, alternatively, 35B where, in conjunction with synthesizer module 36A and voltage-controlled crystal oscillator 37A, the signal is mixed down to intermediate frequency or IF. A high-speed analog-to-digital converter 39A (or 39B) then converts the analog IF signal into a digital signal. Once the IF signal is digitized, digital downconverter 41A (or 41B) translates the signal down to complex baseband. Digital downconverter 41 preferably provides the ability to downconvert, decimate, filter, and control the gain of the signal. After being converted to complex baseband, the signal is demodulated by digital signal processor 42A. Digital signal processor 42A is configured for decoding the received signal data from the standard wireless telephony format, such as GSM, to a common format used internally within the translator.

The common format data is then transferred to digital signal processor 42B in the backhaul transceiver 28 over multi-channel buffered serial port 32. Subsequently, the signal is re-modulated by digital signal processor 42B. The re-modulated signal is output as a complex baseband signal and translated to real IF by digital upconverter 40B. After the signal is translated to real IF, digital-to-analog converter 38C converts the signal back to an analog signal where it is mixed by upconverter 34B in conjunction with synthesizer module 36B and voltage-controlled crystal oscillator 37B. Now ready to be broadcast, the signal passes through cavity filter 29B and is transmitted through the backhaul channel to the BTS through translator directional antenna 13.

The transceivers 27 and 28 are preferably controlled by one or more control circuits. The control circuits can be in the form of a general purpose computer interfaced with the transceiver, a programmable microprocessor integrated with the transceivers with appropriate software, a hardware based controller, or any other combination of microprocessors, electronic circuitry and programming as may be necessary or appropriate for controlling the first and second transceivers.

As shown in FIG. 4, the control circuits include master processor 47 and control processor 46. Master processor 47 preferably controls the operation of backhaul transceiver 28, including selection of transmit and receive frequencies. Master processor 47 is also linked with PCM data and message bus 31 so that it can communicate with control processor 46, and vice versa. Control processor 46 is preferably a slave processor controlled by master processor 47. Control processor 46 can also preferably control the operation of ground sector transceiver 27, including selection of transceiver receive and transmit frequencies.

Translation of the signals transmitted from the BTS through the backhaul channel is similar to the procedure employed to translate signals transmitted from the mobile units. Specifically, a signal, preferably at −70 dBm but typically ranging anywhere from −111 dBm to −25 dBm, is received from a BTS at translator directional antenna 13 attached to backhaul transceiver 28. The signal passes through cavity filter 29B to downconverter 35C where, in conjunction with synthesizer module 36B and voltage-controlled crystal oscillator 37B, the signal is mixed down to IF. Analog-to-digital converter 39C converts the analog IF signal to a digital signal where it is subsequently processed by digital downconverter 41C to complex baseband.

Once converted into complex baseband, the signal is demodulated by digital signal processor 42B and transferred to digital signal processor 42A over multi-channel buffered serial port 32. The signal is then re-modulated by digital signal processor 42A and translated from complex baseband to real IF by digital upconverter 40A. After the signal is translated to real IF, digital-to-analog converter 38A converts the signal back to an analog signal. Upconverter 34A, synthesizer 36A, and voltage-controlled crystal oscillator 37A operate together to mix the signal for transmission. The signal is then amplified by high-power amplifier 30, filtered by cavity filter 29A and transmitted from omni-directional antenna 11A to the mobile unit through the ground link channel.

Figure 5:
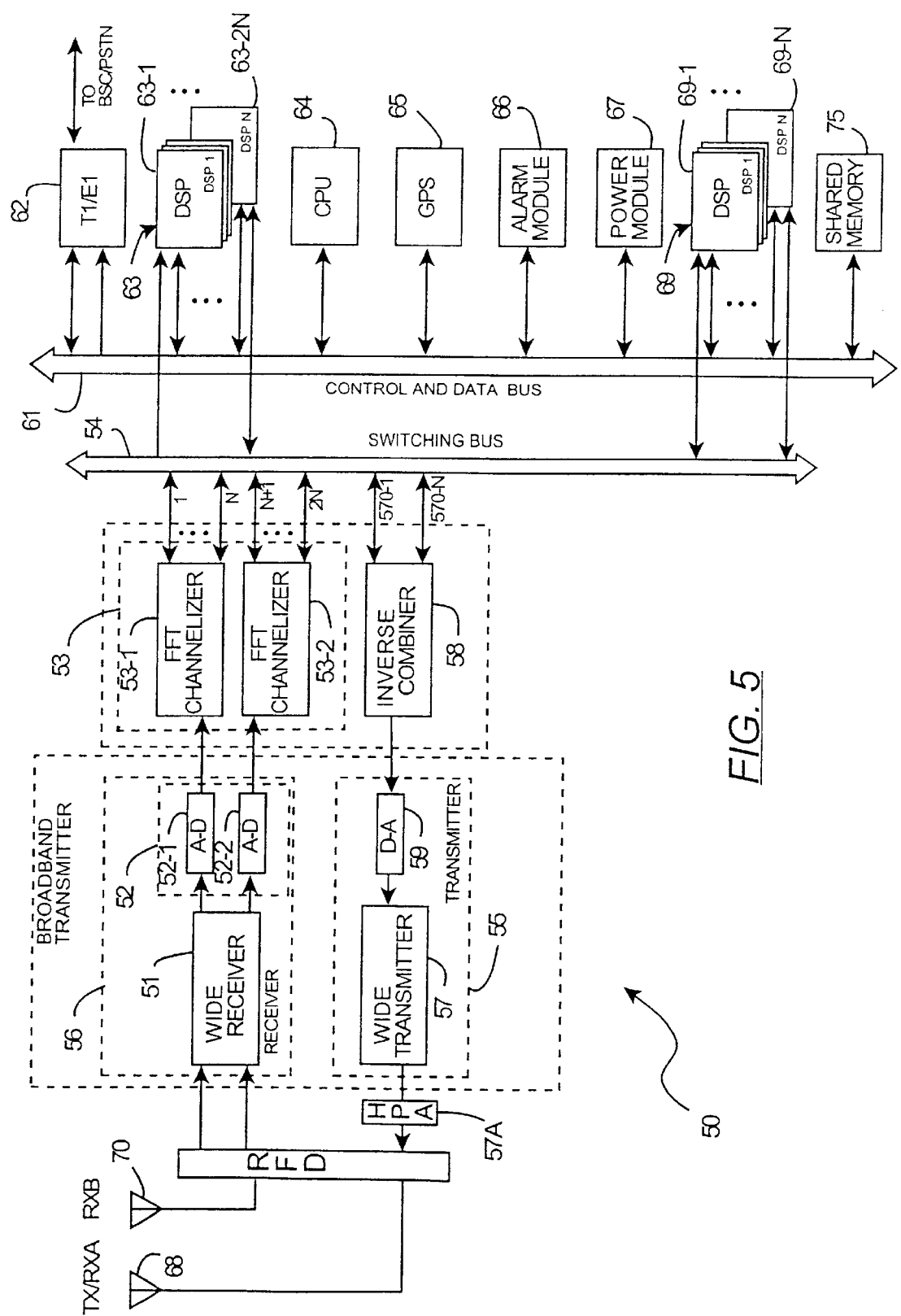
FIG. 5 is a block diagram of an exemplary base transceiver station of the type shown in the wireless communication system of FIG. 1.

Referring now to FIG. 5, a broadband BTS 50 is illustrated, which comprises a receiver section 56 and a transmitter section 55. It will be readily appreciated by those skilled in the art that the particular transceiver architecture shown is not critical. Accordingly, the invention disclosed herein is not intended to be so limited. Receiver section 56 preferably includes antennas 68, 70 and a wideband receiver 51 capable of receiving a plurality of carrier frequency channels. Signals from the received channels can include new power requests, power adjustment requests and traffic channel data from mobile transceiver units. The term "wideband," as used herein, is not limited to any particular spectral range, and it should be understood to imply a spectral coverage of multiple frequency channels within the communication range over which a wireless communication system may operate (e.g. 12 MHz). Narrowband, on the other hand, implies a much smaller portion of the spectrum, for example, the width of an individual channel (e.g. 30 kHz).

The output of the wideband receiver 51 is downconverted into a multi-channel baseband signal that preferably contains the contents of all of the voice/data carrier frequency channels currently operative in the communication system or network of interest. This multichannel baseband signal is preferably coupled to high speed A-D converters 52-1 and 52-2 operating in parallel for diversity receive capability. Where no diversity capability is required, a single A-D 52-1 could be utilized. Additionally, more than one parallel leg may be required for sectorized applications. Hence, it should readily be appreciated by one skilled in the art that the presence of a second parallel processing leg is not intended to be a limitation on the instant invention. The dynamic range and sampling rate capabilities of the A-D converter are sufficiently high (e.g. the sampling rate can be on the order of 25 to 50 Mega-samples per second (Msps)) to enable downstream digital signal processing (DSP) components, including Discrete Fourier Transform (DFT) channelizers 53-1 and 53-2, to process and output each of the active channels received by receiver 56.

The channelized outputs from the A-D converters are further processed to extract the individual channel components for each of the parallel streams. FFT channelizers 53-1 and 53-2 extract from the composite digitized multichannel signals, respective narrowband carrier frequency channel signals. These narrowband signals are representative of the contents of each of the respective individual carrier frequency communication channels received by the wideband receiver 51. The respective carrier frequency channel signals are coupled via N output links through a common data bus 61 to respective digital signal processing receiver units 63-1 ... 63-N, each of which demodulates the received signal and performs any associated error correction processing embedded in the modulated signal. In the case where the received signals are destined for the PSTN, these demodulated signals derived from the digital signal processing receiver units 63 can be sent via a common shared bus 54 to a telephony carrier interface, for example, T1 carrier digital interface 62, of an attendant telephony network (not shown).

The transmitter section 55 includes a second plurality of digital signal processing units, specifically, transmitter digital signal processing units 69-1 ... 69-N, that are coupled to receive from the telephony network respective ones of a plurality of channels containing digital voice/data communication signals to be transmitted over respectively different individual carrier frequency channels of the multichannel network. Transmitter digital signal processing units 69 modulate and perform pre-transmission error correction processing on respective ones of the plurality of incoming communication signals, and supply processed carrier frequency channel signals over the common bus 54 to respective input ports of an inverse FFT-based multichannel combiner unit 58. The combiner 58 outputs a composite multichannel digital signal. This composite signal is representative of the contents of a wideband signal which contains the respective narrowband carrier frequency channel signals output from the digital signal processing transmitter units 69. A composite signal generated from the output of the multichannel combiner unit 58 is then processed by the digital-to-analog (D-A) converter 59. The output of D-A converter 59 is coupled to a wideband (multichannel) transmitter unit 57, which can include or have a separate multichannel high power amplifier (HPA) 57A. The transmitter unit 57 transmits a wideband (multichannel) communication channel signal defined by the composite signal output of the inverse fast Fourier transform-based combiner unit 58. The output of the HPA 57A is then coupled to antenna 68 for transmission.

A central processing unit (CPU) controller 64 is provided for coordinating and controlling the operation of BTS 50. For example, the CPU 64 can include a control processing unit, memory and suitable programming for responding to transmit power control requests received from mobile transceiver units. CPU 64 can selectively control transmit power levels of each TDM communication channels on a timeslot-by-timeslot basis. The CPU 64 may be a microprocessor, DSP processor, or micro controller having firmware, software or any combination thereof.

DSPs 63 can extract information from each of the narrowband carrier frequency channel signals. Information for each of these channels can be stored in shared memory 75 through the common control and data bus 61. CPU 64, under firmware and/or software control, can then access the shared memory 75 through bus 61. For example, control channel data concerning a particular downlink or control channel can be received at antenna 70 from a repeater station through a backhaul communication link. After the information for each channel in the received signal is processed and separated, DSPs 63 can store the control channel data in the shared memory 75. CPU 64 can then access shared memory 75 to retrieve the control channel data. CPU 64, under software and/or firmware control, can then use this data, for example, as an input to a control algorithm. The output from the algorithm can be stored in shared memory 75 for later use.

In conventional repeater systems, the uplink and downlink RF carrier pairs 20 forming the communication link between the mobile transceiver units 18 and the repeater station 12, are modulated using a standard GSM modulation scheme, namely, Gaussian Minimum Shift Keying (GMSK). In these conventional systems, once these signals are received at repeater station 12, they are retransmitted using the same modulation scheme. By comparison, the present invention utilizes conventional modulation, such as GMSK, in the link between the mobile unit 18 and the repeater station 12, but advantageously makes use of a second higher-order modulation scheme on the backhaul communication link 19 between the repeater station 12 and the base transceiver station 15. The higher-order modulation is possible because the carrier-to-interference (C/I) ratio and noise levels on the backhaul communication link tend to be higher and vary less over time as compared to the communication link between the mobile unit 18 and the repeater station 12. Use of a higher-order modulation scheme on the uplink channel of the backhaul communication link 19-1 permits more repeater traffic channels to be accommodated on a single backhaul carrier.

In a preferred embodiment, the second modulation scheme is advantageously selected to have a data rate larger than the GMSK data rate by a factor approximately equal to at least the number of TDM channels in the link between the mobile unit 18 and the repeater station 12. In this manner, all of the TDM channels on a single carrier on the mobile/repeater link 20 can be compressed within a single uplink TDM channel on the backhaul communication link 19. For example, using Phase Shift Keying (PSK) having 8 states, a single carrier frequency on the mobile/repeater link 20, having eight timeslots, can contain information from up to four (4) mobile units. Information from these eight (8) timeslots can be compressed into just 2 uplink timeslots or uplink TDM channels on the backhaul communication link 19 without upsetting the format of the GSM TDMA frame format. In particular, the backhaul communication link can maintain a format that is consistent with a typical GSM TDMA frame. This is advantageous since other base transceiver stations having a suitable demodulator can be used in the system.

While exemplary systems and methods embodying the present invention are shown by way of example, it will be understood that the invention is not limited to these embodiments. Modifications may be made by those skilled in the art, particularly in light of the foregoing teachings. For example, each of the elements of the aforementioned embodiments may be utilized alone or in combination with elements of the other embodiments.

What is claimed is:

1. In a wireless cellular communication system having a base station located within a home cell, and a plurality of substantially adjacent cells each having a repeater station located therein, a method for supporting increased capacity on an in-band backhaul communication link carrier frequency, comprising:

receiving at one of said repeater stations, a first RF signal having a first modulation scheme from a mobile transceiver unit on an in-band uplink channel;

demodulating at said repeater station, said first RF signal from the mobile transceiver unit to obtain a digital data stream;

modifying at least one bit of said digital data stream by said repeater station;

re-modulating said modified digital data stream onto a second in-band RF signal at said repeater station using a second modulation scheme having a higher-order modulation as compared to said first modulation scheme; and transmitting from said repeater station, said second RF signal having said higher-order modulation over said backhaul communication link.

2. The method according to claim 1, wherein each of said first and said second RF signal is comprised of a plurality of TDM channels and each mobile unit is assigned one of said TDM channels of said first RF signal.

3. The method according to claim 2, wherein said plurality of said TDM channels of said first RF signal are compressed within a single TDM channel on said second RF signal.

4. The method according to claim 2, wherein said first modulation scheme has a first associated data rate and said second modulation scheme has a second associated data rate, said second data rate being at least equal to said first data rate.

5. The method according to claim 4, wherein said second data rate is at least equal to a combined data rate of said TDM channels comprising said first RF signal.

6. The method according to claim 1, wherein said first modulation scheme is Gaussian Minimum Shift Keying (GMSK).

7. The method according to claim 1, wherein said second modulation scheme is Phase Shift Keying (PSK) having at least 8 states (8-PSK).

8. The method according to claim 1, wherein said modifying comprises digital sampling and reconstruction.

9. The method according to claim 1, wherein said modifying is at least one selected from the group consisting of error detection and correction, diversity processing, removal of control information and addition of alarm/status bits.

10. In a wireless cellular communication system having a base station located within a home cell, and a plurality of substantially adjacent cells each having a repeater station located therein, a method for supporting increased capacity on an in-band backhaul communication link carrier frequency, comprising:

receiving at one of said repeater stations, a first in-band RF signal having a plurality of TDM channels, from a mobile transceiver unit on an in-band uplink channel, said first RF signal having a Gaussian Minimum Shift Keying (GMSK) modulation scheme;

demodulating at said repeater station, said first RF signal from the mobile transceiver unit to obtain a digital data stream representative of traffic and control data;

modifying at least one bit of said digital data stream by said repeater station;

re-modulating said modified digital data stream onto a second in-band RF signal having a plurality of TDM channels, at said repeater station using Phase shift Keying (PSK) having at least 8 states (8-PSK); and transmitting from said repeater station, said second RF signal containing a plurality of TDM channels over said backhaul communication link, each of said plurality of TDM channels having encoded therein, a plurality of TDM channels from said first RF signal.

11. In a wireless cellular communication system having a base station located within a home cell, and a plurality of substantially adjacent cells each having a repeater station located therein, a method for aggregating data on an in-band backhaul communication link, comprising:

receiving in-band uplink RF carrier signals from each of a plurality of mobile units at a repeater station;

demodulating at said repeater station, said uplink RF signals from said mobile units to obtain a digital data stream;

modifying at least one-bit of each of said digital data streams by said repeater station;

compressing at said repeater station, each of said modified digital data streams into a single in-band RF carrier signal; and transmitting said single RF carrier signal containing said compressed uplink RF carrier signals from said repeater station on an uplink channel backhaul communication link to said base station within said home cell.

12. In a wireless cellular communication system having a base station located within a home cell, and a plurality of substantially adjacent cells each having a repeater station located therein, a system for supporting increased capacity on an in band backhaul communication link carrier frequency, comprising:

a receiver for receiving at one of said repeater stations, a first in-band RF signal having a first modulation scheme from a mobile transceiver unit on an uplink channel;

a demodulator provided within said receiver for demodulating at said repeater station, said first RF signal from the mobile transceiver unit to obtain a digital data stream;

a processor provided within said receiver for modifying at least one bit of said digital data stream by said repeater station;

a digital communication link for communicating said modified digital data stream from said demodulator to a modulator, said modulator for modulating said digital data stream onto a second in-band RF signal at said repeater station using a second modulation scheme having a higher-order modulation as compared to said first modulation scheme; and a transmitter coupled to said modulator for transmitting from said repeater station, said second RF signal having said higher-order modulation over said backhaul communication link.

13. The system according to claim 12, wherein each of said first and said second RF signal is comprised of a plurality of TDM channels and each mobile unit is assigned one of said TDM channels of said first RF signal.

14. The system according to claim 13, wherein said plurality of said TDM channels of said first RF signal are compressed within a single TDM channel on said second RF signal.

15. The system according to claim 13, wherein said first modulation scheme has a first associated data rate and said second modulation scheme has a second associated data rate, said second data rate being at least equal to said first data rate.

16. The system according to claim 15, wherein said second data rate is at least equal to a combined data rate of said TDM channels comprising said first RF signal.

17. The system according to claim 12, wherein said first modulation scheme is Gaussian Minimum Shift Keying (GMSK).

18. The system according to claim 12, wherein said second modulation scheme is Phase Shift Keying (PSK) having at least 8 states (8-PSK).

19. The system according to claim 18, wherein said processor performs digital sampling and reconstruction.

20. The system according to claim 18, wherein processor performs at least one function from the group consisting of error detection and correction, diversity processing, removal of control information and addition of alarm/status bits.

21. In a wireless cellular communication system having a base station located within a home cell, and a plurality of substantially adjacent cells each having a repeater station located therein, a system for supporting increased capacity on an in-band backhaul communication link carrier frequency, comprising:

a receiver for receiving at one of said repeater stations, a first in-band RF signal having a plurality of TDM channels, from a mobile transceiver unit on an uplink channel, said first RF signal having a Gaussian Minimum Shift Keying (GMSK) modulation scheme;

a demodulator provided within said receiver for demodulating at said repeater station, said first RF signal from the mobile transceiver unit to obtain a digital data stream representative of traffic and control data;

a processor provided within said receiver for modifying at least one bit of said digital data stream by said repeater station;

a digital communication link for communicating said modified digital data stream from said demodulator to a modulator, said modulator for re-modulating said digital data stream onto a second in-band RF signal having a plurality of TDM channels, at said repeater station using Phase Shift Keying (PSK) having at least 8 states (8-PSK); and a transmitter coupled to said demodulator for transmitting from said repeater station, said second RF signal containing a plurality of TDM channels over said backhaul communication link, each of said plurality of TDM channels having encoded therein, a plurality of TDM channels from said first RF signal.

22. In a wireless cellular communication system having a base station located within a home cell, and a plurality of substantially adjacent cells each having a repeater station located therein, a system for aggregating in-band uplink signals on an in-band backhaul communication signal, comprising:

a receiver for receiving uplink in-band RF carrier signals from each of a plurality of mobile units at a repeater station;

a demodulator at said repeater station to obtain a plurality of digital data streams from each of said RF signals;

a signal processor coupled to said demodulator for modifying at least one bit of each of said digital data streams and compressing each of said modified digital data streams into a single in-band RF carrier signal; and a transmitter coupled to said signal processor for transmitting said single RF carrier signal containing said compressed uplink RF carrier signals from said repeater station on an in-band uplink channel backhaul communication link to said base station within said home cell.

* * * * *

UNITED STATES PATENT AND TRADEMARK OFFICE
CERTIFICATE OF CORRECTION

PATENT NO. : 6,370,185 B1  
DATED : April 9, 2002  
INVENTOR(S) : Schmutz et al.

It is certified that error appears in the above-identified patent and that said Letters Patent is hereby corrected as shown below:

<u>Column 12,</u>  
Line 60, replace "18" with -- 12 --.  
Line 62, replace "18, wherein processor" with -- 12, wherein said processor --.

Signed and Sealed this

Thirteenth Day of August, 2002

*Attest:*

JAMES E. ROGAN  
*Attesting Officer*     *Director of the United States Patent and Trademark Office*